(12) United States Patent
Ichikawa

(10) Patent No.: US 7,497,999 B2
(45) Date of Patent: Mar. 3, 2009

(54) HONEYCOMB STRUCTURAL BODY, METHOD OF MANUFACTURING THE STRUCTURAL BODY, AND CATALYST BODY USING THE STRUCTURAL BODY

(75) Inventor: Yukihito Ichikawa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 535 days.

(21) Appl. No.: 10/507,185

(22) PCT Filed: Feb. 13, 2003

(86) PCT No.: PCT/JP03/01504

§ 371 (c)(1),
(2), (4) Date: Sep. 10, 2004

(87) PCT Pub. No.: WO03/080245

PCT Pub. Date: Oct. 2, 2003

(65) Prior Publication Data

US 2005/0129590 A1     Jun. 16, 2005

(30) Foreign Application Priority Data

Mar. 27, 2002    (JP)  .............................. 2002-088036

(51) Int. Cl.
*B01D 50/00* (2006.01)
*B01D 53/34* (2006.01)
*B32B 3/12* (2006.01)

(52) U.S. Cl. ........................ 422/177; 422/180; 428/116; 502/439

(58) Field of Classification Search ................ 422/180, 422/177; 428/116; 502/439
See application file for complete search history.

(56) References Cited

U.S. PATENT DOCUMENTS 4,568,402 A * 2/1986 Ogawa et al. ............ 156/89.22

(Continued)

FOREIGN PATENT DOCUMENTS

JP     A 58-043238     3/1983

(Continued)

OTHER PUBLICATIONS

Machine Translation of JP 2001-179054 A.*

*Primary Examiner*—Walter D Griffin
*Assistant Examiner*—Natasha Young
(74) *Attorney, Agent, or Firm*—Oliff & Berridge, PLC (57) ABSTRACT

A honeycomb structure of the present invention is a honeycomb structure 1 including: a cell structural part 2 including a plurality of cells 6 partitioned by partition walls 4 in a honeycomb shape to form flow paths allowing a fluid to flow therein; and an outer wall 3 disposed on an outer peripheral surface 7 of the cell structural part 2, characterized in that an outermost peripheral cell 9 of the cell structural part 2 and a predetermined number of cells positioned in an inner direction from the outermost peripheral cell among the cells 6 are sealed by an inner peripheral surface of the outer wall 3 in an end portion and/or an intermediate portion of at least one of the outermost peripheral cell and the outer peripheral cell in a central axis direction to constitute shielded cells 11, a temperature rising time of the cell structural part 2 after start of an operation shortens, and a catalytic activity can be enhanced in a short time when a catalyst is supported.

9 Claims, 10 Drawing Sheets

U.S. PATENT DOCUMENTS 5,720,787 A * 2/1998 Kasai et al. .................... 55/282
5,750,026 A * 5/1998 Gadkaree et al. ......... 210/502.1

FOREIGN PATENT DOCUMENTS

| | | |
|---|---|---|
| JP | U 63-144836 | 9/1988 |
| JP | U 1-101639 | 7/1989 |
| JP | A 3-275309 | 12/1991 |
| JP | A 4-358541 | 12/1992 |
| JP | A 5-269388 | 10/1993 |
| JP | 07-024332 A | 1/1995 |
| JP | 10089056 A * | 4/1998 |
| JP | 2001179054 A * | 7/2001 |
| WO | WO 00/48775 | 8/2000 |

* cited by examiner

HONEYCOMB STRUCTURAL BODY, METHOD OF MANUFACTURING THE STRUCTURAL BODY, AND CATALYST BODY USING THE STRUCTURAL BODY

TECHNICAL FIELD

The present invention relates to a honeycomb structure, a method of manufacturing the honeycomb structure, and a catalyst body using the honeycomb structure. In more detail, the present invention relates to a honeycomb structure in which an outer wall is disposed on an outermost side of the honeycomb structure (on an outer peripheral surface of a cell structural part) and in which a temperature rising time for the cell structural part after start of an operation shortens and in which a catalytic activity can be enhanced in a short time when a catalyst is supported, a method of manufacturing the honeycomb structure, and a catalyst body using the honeycomb structure.

BACKGROUND ART

In recent years, to cope with automobile exhaust gas regulations which have been reinforced year by year, a honeycomb structure (catalyst body) supporting a catalyst has been used in order to remove nitrogen oxide, sulfur oxide, hydrogen chloride, hydrogen carbide, carbon monoxide and the like contained in an automobile exhaust gas. The catalyst supported by partition walls of the honeycomb structure adsorbs and decomposes the above-described toxic substances contained in the automobile exhaust gas to purify the automobile exhaust gas.

Since a catalytic activity of the catalyst for use in the honeycomb structure (catalyst body) supporting the catalyst usually increases in a high-temperature region, an automobile is run in a low state of the catalytic activity, and an insufficiently purified exhaust gas is exhausted from start of the running of the automobile until a temperature of the honeycomb structure rises. Therefore, the operation of the honeycomb structure at the low temperature needs to be performed in a time as short as possible. As one of methods, a thermal capacity of the honeycomb structure is reduced, and the temperature of the honeycomb structure is raised in a short time after the start of the running of the automobile. To reduce the thermal capacity of the honeycomb structure, a weight needs to be reduced (bulk density needs to be reduced) without changing a geometric surface area of the honeycomb structure, and to attain this, there is a method in which a thickness of the partition wall of a cell is reduced or a porosity is increased. However, the reduced bulk density by the thinning of the partition wall of the cell and the increasing of the porosity has caused a drop in mechanical strength of the honeycomb structure. A catalyst body for purifying a large flow rate of exhaust gas exhausted from a large-sized automobile such as a truck also requires a large volume, and a honeycomb structure which is a catalyst carrier having a large section is required to lower a pressure loss. As described also in Japanese Patent Application Laid-Open No. 3-275309, there has been a problem that a cell partition wall in an outer peripheral part of the honeycomb structure is deformed under the weight of the honeycomb structure at the time of extrusion.

To prevent the mechanical strength from dropping, it has been proposed that after forming and firing the honeycomb structure, a partition wall deformed region of an outer peripheral part of the structure should be removed to coat an outer peripheral surface of the structure with an outer wall by ceramic cement coating (form an outer shell layer) (Japanese Patent Application Laid-Open No. 5-269388). However, in this method, the mechanical strength of the honeycomb structure can be increased, but the thermal capacity of the outer wall increases, and heat inside the honeycomb structure (cell structural part) escapes toward the outer wall side (expands). Therefore, there has been a problem that a temperature rising rate of the honeycomb structure at the start of the operation drops and that the catalytic activity of the supported catalyst does not easily increase in a short time. As described in Japanese Utility Model Application Laid-Open No. 63-144836, it has been proposed that a coating layer should be disposed on the outer peripheral surface of the integrally extruded honeycomb structure to improve an outer diameter precision of the honeycomb structure. When the partition wall is thinned, the mechanical strength of the honeycomb structure drops. However, when the mechanical strength drops to such an extent that the structure cannot resist canning bearing, a method is used in which the outer diameter precision of the honeycomb structure is improved to set a clearance range at a canning time to be appropriate in order to reduce the canning bearing. However, in this means for disposing the coating layer on the outer peripheral surface of the integrally manufactured honeycomb structure, resistance to the canning of the honeycomb structure can be improved, but the same problem as that of the above-described honeycomb structure including the outer periphery coated with ceramic cement occurs that the thermal capacity of the outer wall increases and that the heat inside the honeycomb structure (cell structural part) escapes toward the outer wall side (expands).

The present invention has been developed in consideration of the above-described problem, and an object thereof is to provide a honeycomb structure, for example, in which an outer peripheral region of the integrally formed honeycomb structure is removed, and an outer wall by ceramic cement or the like is disposed on an outermost side of the honeycomb structure (on the outer peripheral surface of a cell structural part) and in which a temperature rising time for the cell structural part after start of an operation shortens and in which a catalytic activity can be increased in a short time when a catalyst is supported, a manufacturing method capable of efficiently manufacturing the honeycomb structure, and a catalyst body in which a catalyst is supported on the honeycomb structure. The present invention fulfills an effect especially in a honeycomb structure whose outer peripheral region is removed after the honeycomb structure is integrally formed and whose outer wall needs to be newly formed by a coating by ceramic cement or the like, and is especially effective for a honeycomb structure including a thin partition wall or having a large sectional-area. For example, in a cordierite honeycomb structure having a diameter of around $\phi 100$ mm for use in a catalyst body for purifying an exhaust gas from an automobile, in recent years, the structure having a reduced partition wall thickness of 6 mil (0.152 mm) or less has been put to practical use, and the present invention is especially effective in a thickness of 3 mil (0.076 mm) or less. A cordierite honeycomb structure including a large section having a diameter of approximately $\phi 130$ mm or more for use in a catalyst body or a filter for purifying an exhaust gas from a large-sized diesel car has been put to practical use, the partition wall usually having a thickness of 6 mil or more has been generally used, but the present invention is effective also in the honeycomb structure, or further effective especially in the honeycomb structure having a partition wall thickness of 6 mil or less. A cell density for general use is 300 to 1200 cpsi (cells/square inch) in the honeycomb structure for the catalyst body, or 100 to 300 cpsi in the honeycomb structure for the filter, but the density is not restricted to them. Furthermore, outer wall forming means is not restricted to only the methods seen in the related arts, and methods such as flame spraying may also be used.

DISCLOSURE OF THE INVENTION

To achieve the above-described object, according to the present invention, there are provided the following honeycomb structure, method of manufacturing the structure, and catalyst body using the structure.

[1] A honeycomb structure comprising: a cell structural part including a plurality of cells partitioned by partition walls in a honeycomb shape to form flow paths allowing a fluid to flow therein; and an outer wall disposed on an outer peripheral surface of the cell structural part, characterized in that an outermost peripheral cell positioned in an outermost periphery of the cell structural part and a predetermined number of cells (outer peripheral cells) positioned in an inner direction from the outermost peripheral cell among the cells are sealed by an inner peripheral surface of the outer wall in an end portion and/or an intermediate portion of at least one of the outermost peripheral cell and the outer peripheral cell in a central axis direction to form shielded cells which prevent the fluid from flowing.

[2] The honeycomb structure according to [1], wherein a thickness of the shielded cell in a diametric direction of the honeycomb structure is 10% or less of an outer diameter of the honeycomb structure.

[3] The honeycomb structure according to [1] or [2], wherein the cell structural part and the outer wall are constituted of ceramic materials.

[4] The honeycomb structure according to any of [1] to [3], wherein the cell structural part and the outer wall are constituted of metal materials.

[5] The honeycomb structure according to [1] or [2], wherein the cell structural part contains a material having an adsorption function or a catalyst function.

[6] The honeycomb structure according to any of [1] to [5], wherein the outer wall is constituted of a heat-resistant material.

[7] The honeycomb structure according to any of [1] to [6], for use as a filter, wherein opposite end portions of the cells in the central axis direction are alternately plugged.

[8] A catalyst body comprising the honeycomb structure according to any of [1] to [7] which supports a catalyst inside the cells and/or inside the partition walls.

[9] The catalyst body according to [8], wherein the catalyst has a function of purifying an automobile exhaust gas.

[10] A method of manufacturing a honeycomb structure, comprising the steps of: preparing a cylindrical cell structural part including a plurality of cells partitioned by partition walls in a honeycomb shape to form flow paths allowing a fluid to flow therein by extrusion; and drying and firing the cell structural part, characterized in that shrinkage factors of opposite end portions of the cell structural part in a central axis direction are set to be different from each other to thereby form the cell structural part into a truncated cone shape, an outer peripheral surface of the truncated cone shape of the cell structural part is worked into a cylindrical shape, and an outer wall is disposed on the outer peripheral surface worked into the cylindrical shape.

[11] A method of manufacturing a honeycomb structure, characterized by comprising the steps of: preparing a cylindrical cell structural part including a plurality of cells partitioned by partition walls in a honeycomb shape to form flow paths allowing a fluid to flow therein by extrusion; drying and firing the cell structural part; working an outer peripheral surface of the cell structural part into a truncated cone shape; and disposing an outer wall on the outer peripheral surface worked into the truncated cone shape.

[12] A method of manufacturing a honeycomb structure, characterized by comprising the steps of: preparing a cell structural part including a plurality of cells partitioned by partition walls in a honeycomb shape to form flow paths allowing a fluid to flow therein by extrusion; drying and firing the cell structural part; working an outer peripheral surface of the cell structural part into a cylindrical shape inclined with respect to a central axis direction of the cell structural part; and disposing an outer wall on the outer peripheral surface worked into the inclined cylindrical shape.

[13] A method of manufacturing a honeycomb structure, characterized by comprising the steps of: preparing a cell structural part including a plurality of cells partitioned by partition walls in a honeycomb shape to form flow paths allowing a fluid to flow therein by extrusion; drying and firing the cell structural part; working an outer peripheral surface of the cell structural part in such a manner as to form concave/convex portions; and disposing an outer wall on the outer peripheral surface worked in such a manner as to form the concave/convex portions.

[14] A method of manufacturing a honeycomb structure, characterized by comprising the steps of: preparing a cell structural part including a plurality of cells partitioned by partition walls in a honeycomb shape to form flow paths allowing a fluid to flow therein and having a curved axis by extrusion; drying and firing the cell structural part; working an outer peripheral surface of the cell structural part into a cylindrical shape; and disposing an outer wall on the outer peripheral surface worked into the cylindrical shape.

BRIEF DESCRIPTION OF THE DRAWINGS

FIG. 6 is a sectional view of the honeycomb structure of the present invention cut by the plane including the central axis.

FIG. 7 is a graph showing a temperature distribution inside the honeycomb structure at a time when a gas flows through the honeycomb structure of the present invention.

FIG. 8 is an explanatory view showing another embodiment of the present invention.

FIG. 9 is an explanatory view showing another embodiment of the present invention.

FIG. 10 is an explanatory view showing another embodiment of the present invention.

FIG. 11 is a sectional view schematically showing the honeycomb structure of the present invention cut by the plane including the central axis, FIG. 12 is a sectional view schematically showing the honeycomb structure of the present invention cut by a plane crossing the central axis at right angles.

BEST MODE FOR CARRYING OUT THE INVENTION

Embodiments of the present invention will be described hereinafter concretely with reference to the drawings, but it should be understood that the present invention is not limited to the following embodiments and that modifications, improvements and the like of designs are appropriately added without departing from the scope of the present invention based on ordinary knowledge of a person skilled in the art.

Figure 1:
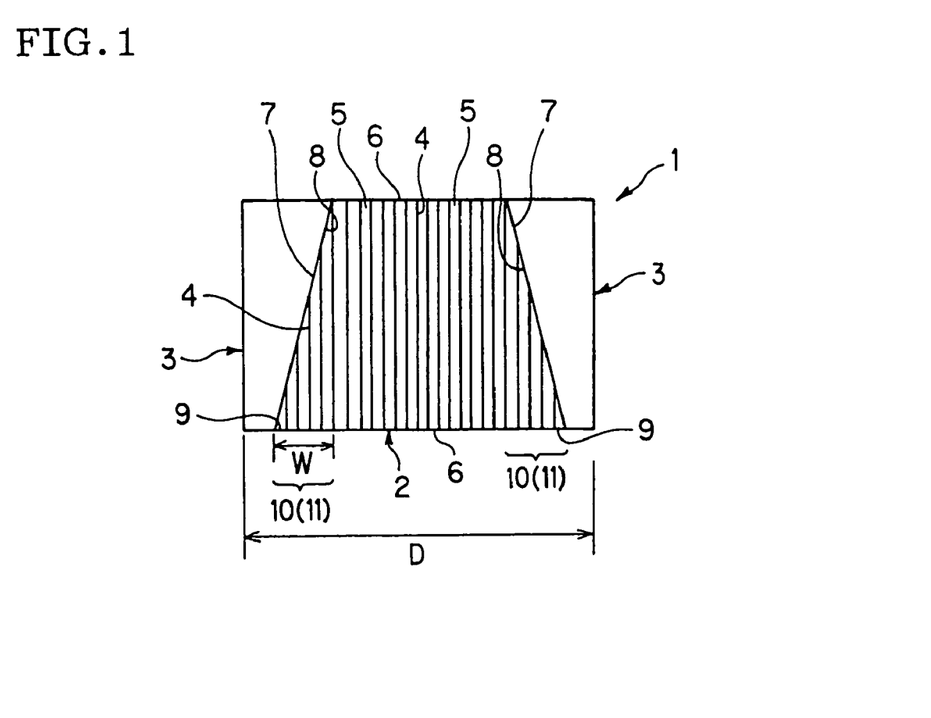
FIG. 1 is a sectional view of a honeycomb structure cut by a plane including a central axis in one embodiment of the present invention.

FIG. 1 is a sectional view of a honeycomb structure cut by a plane including a central axis in one embodiment of the present invention. In FIG. 1, a honeycomb structure 1 is constituted of a cell structural part 2 having a truncated cone shape, and an outer wall 3 disposed on an outer peripheral surface 7 of the cell structural part 2 (corresponding to a side surface of a truncated cone). An outer periphery of the outer wall 3 is formed into a cylindrical shape, and an inner peripheral surface 8 of the outer wall 3 extends along the outer peripheral surface 7 of the cell structural part 2. The cell structural part 2 is partitioned by the partition walls 4 in a honeycomb shape, and is constituted of a large number of cells 6 including flow paths 5 allowing a fluid to flow therein and arranged in parallel with one another. The truncated cone shaped outer peripheral surface 7 (corresponding to the side surface of the truncated cone) of the cell structural part 2 has a structure corresponding to a tapered (truncated cone shaped) worked surface formed when portions corresponding to outer peripheral cells (an outermost peripheral cell 9 positioned in an outermost periphery and a predetermined number of cells 6 positioned in an inner direction from the outermost peripheral cell) 10 of a cylindrical cell structure constituted of a large number of cells arranged in parallel are cut (machined) into a tapered shape (truncated cone shape). The outer peripheral surface of the cell structural part is formed in such a manner that cut surfaces (end surfaces) obtained by cutting the respective cells obliquely with respect to the central axis direction are aligned along the side surface of the truncated cone. The end surfaces of the respective cells constituting the outer peripheral surface 7 are sealed by the inner peripheral surface 8 of the outer wall 3. Accordingly, the outer peripheral cells (the outermost peripheral cell 9 positioned in the outermost periphery and the predetermined number of cells 6 positioned in the inner direction from the outermost peripheral cell) 10 of the cell structural part 2 constitute shielded cells 11 which prevent the fluid from flowing. Here, a central axis refers to an axis passing through a sectional center (figure center) of the cell structural part.

As described above, in the honeycomb structure 1 in the present embodiment, the outer peripheral cells 10 of the cell structural part 2 are formed as the shielded cells 11, the outer wall 3 is disposed on the outer peripheral surface 7 of the cell structural part 2, therefore the shielded cells 11 constitute thermal insulating layers, and heat of the cells (through-cells) inside the outer peripheral cells 10 of the cell structural part 2 in a diametric direction is not easily transferred to the outer wall 4. Accordingly, when the through-cells are heated, the heat does not easily escape toward the outer wall 3, temperature can be raised in a short time, and a catalytic activity can be enhanced in a short time when a catalyst is supported. Especially, the honeycomb structure can be preferably used as a thin-wall large-sized honeycomb structure for purifying a diesel exhaust gas. Here, a sectional shape of the honeycomb structure 1 vertical to the central axis is not limited to a circular shape, and may also be elliptic, oblong, or unusual. This also applies to the cell structural part 2. The cylindrical shape means that not only the circular shape but also these different section shapes are all included. The sectional shape of the flow path 5 may also be any of triangular, quadrangular, hexagonal, and circular shapes and the like, and is not especially restricted. The shielded cells 11 preferably exist over the whole periphery or length of the honeycomb structure 1, but may partially exist. Furthermore, a region of the shielded cells 11 has a certain degree of width, and several cells preferably exist, but one cell may also exist.

In the present embodiment, a thickness W of the shielded cell 11 (outer peripheral cell 10) in the diametric direction of the honeycomb structure 1 is preferably 10% or less of an outer diameter D of the honeycomb structure. When the thickness exceeds 10%, a thermal insulating effect of the shielded cell 11 increases. Therefore, even when the cells (through-cells) inside the shielded cells 11 of the cell structural part 2 cause a rapid temperature change, temperature changes of the shielded cells 11 sometimes become very small. Therefore, a difference in temperature between the through-cell and the shielded cell increases, accordingly a large difference is made in thermal expansion, a large tensile stress is generated between the through-cell and the shielded cell in the central axis direction and the diametric direction of the honeycomb structure 1, and the honeycomb structure 1 is sometimes cracked. When the thickness W of the shielded cell 11 becomes excessively large, a pressure loss at a time when the gas flows through the honeycomb structure 1 also sometimes increases. Here, the outer diameter D is a diameter calculated assuming that a honeycomb structure outer peripheral length is an outer peripheral length of a circle (=diameter×ratio of the circumference of the circle to its diameter). When the honeycomb structure has a circular section, the outer diameter D is the diameter of the circle. When the structure has an elliptic section, the outer diameter is the diameter of the circle in a case where an elliptic outer contour length is regarded as the outer peripheral length of the circle.

Figure 11A:
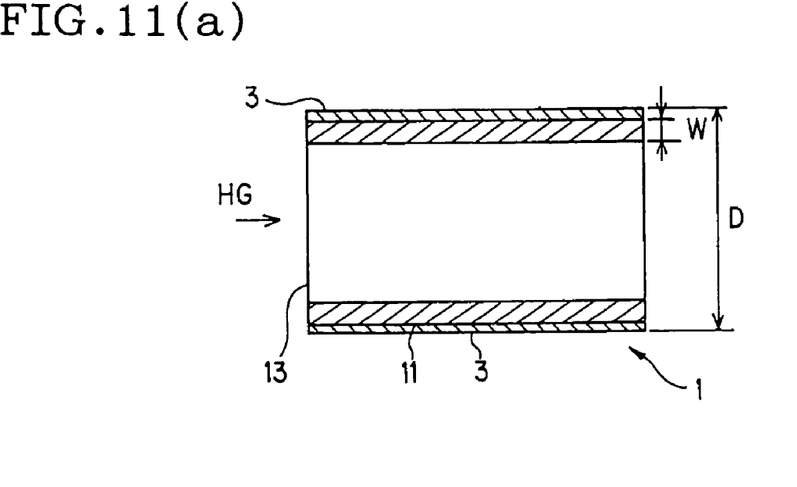
FIG. 11(a) shows a state before the gas flows.
Figure 11B:
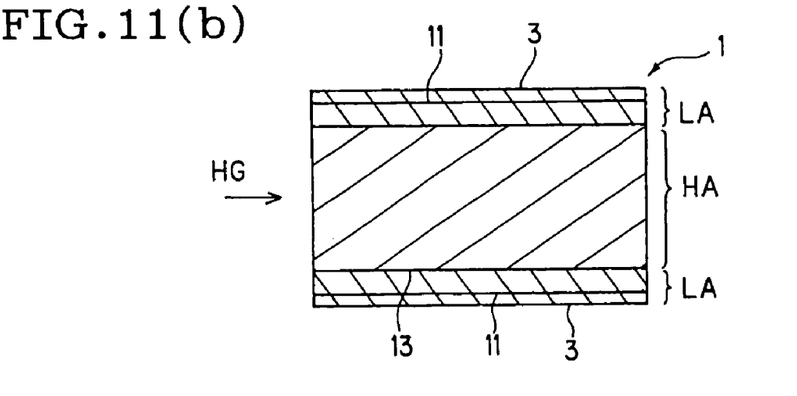
FIG. 11(b) shows a state at a time when the gas flows.
Figure 11C:
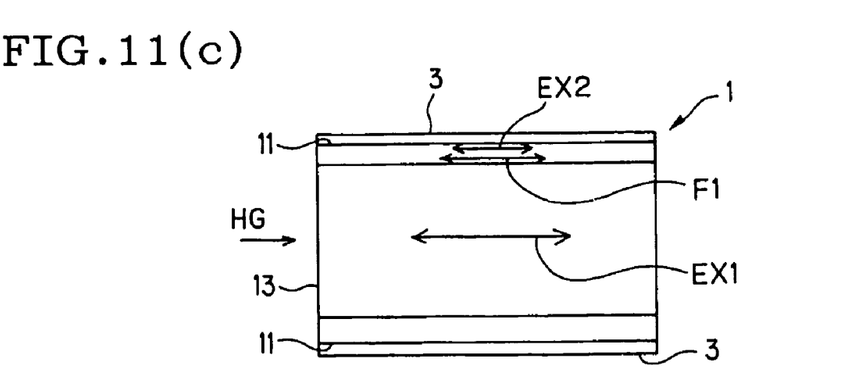
FIG. 11(c) shows a state of thermal expansion at a time when the gas flows.

For example, as shown in FIG. 11(a), when a high-temperature gas HG flows from one end part of the honeycomb structure 1, the high-temperature gas HG passes through a through-cell 13 positioned in an inner peripheral portion of the shielded cell 11, and is exhausted from the other end part. In this case, as shown in FIG. 11(b), when the through-cell 13 is heated by the high-temperature gas HG to form a high-temperature region HA, the exhaust gas does not flow through the shielded cell 11 positioned in the outer periphery of the through-cell 13, further temperature is not easily transferred, a relatively low-temperature region LA is formed, and the outer wall 3 positioned further in the outer periphery of the shielded cell 11 also forms the low-temperature region LA. Moreover, when the thickness W of the shielded cell 11 in the diametric direction of the honeycomb structure 1 exceeds 10% of an outer shape D of the honeycomb structure, a difference in temperature between the through-cell 13 and the shielded cell 11 increases. Therefore, as shown in FIG. 11(c), thermal expansion of the through-cell 13 in a direction shown by EX1 becomes large as compared with that of the shielded cell 11 in a direction shown by EX2. Accordingly, a tensile stress in a central axis direction shown by F1 acting on the shielded cell 11 increases, and cracks are sometimes generated.

Figure 12A:
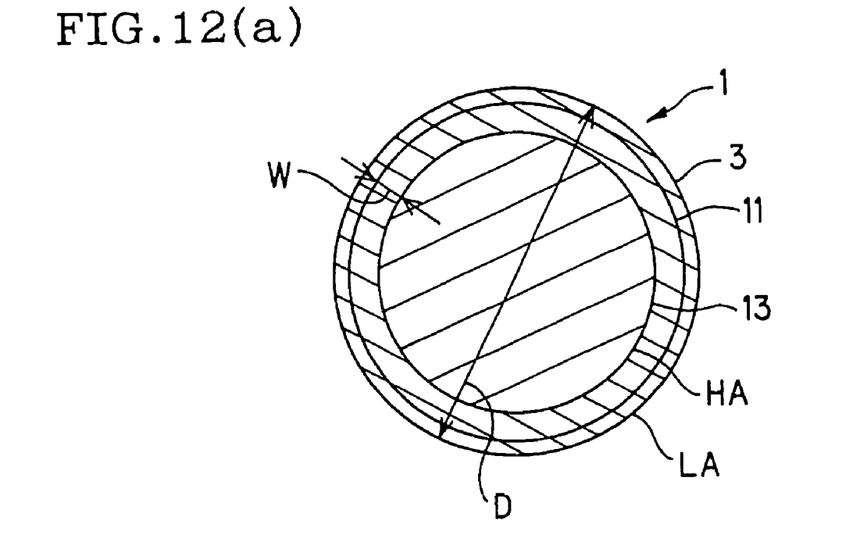
FIG. 12(a) shows a state at a time when the gas flows.
Figure 12B:
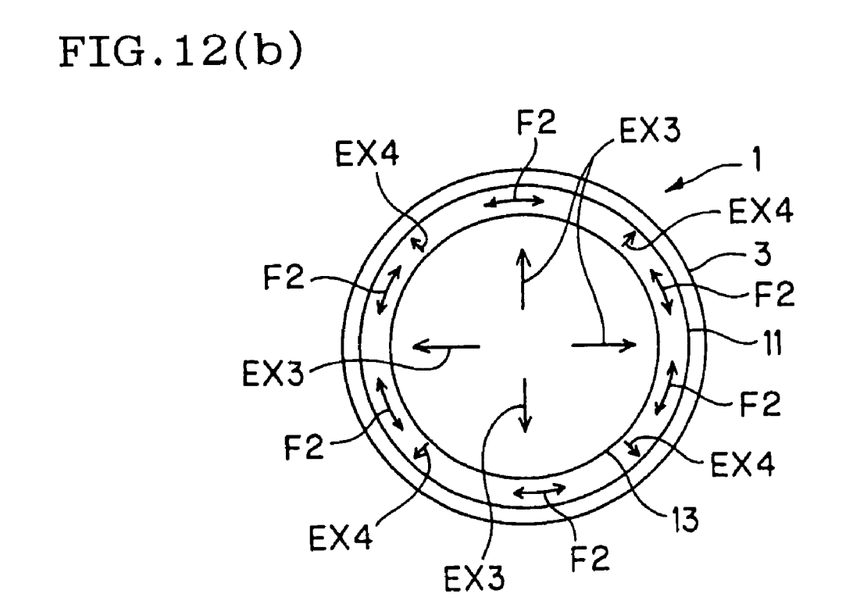
FIG. 12(b) shows a state of thermal expansion at a time when the gas flows.

Moreover, as shown in FIG. 12(a), a section obtained by cutting the honeycomb structure 1 by a plane vertical to an axial direction is studied. A through-cell 13 through which a high-temperature gas HG (not shown) flows forms a high-temperature region, the exhaust gas does not flow through the shielded cell 11 positioned in the outer periphery of the through-cell 13, further temperature is not easily transferred, a relatively low-temperature region is formed, and the outer wall 3 positioned further in the outer periphery of the shielded cell 11 also forms the low-temperature region. Moreover, when the thickness W of the shielded cell 11 in the diametric direction of the honeycomb structure 1 exceeds 10% of an outer shape D of the honeycomb structure, a difference in temperature between the through-cell 13 and the shielded cell 11 increases. Therefore, as shown in FIG. 12(b), thermal expansion of the through-cell 13 in a direction shown by EX3 becomes large as compared with that of the shielded cell 11 in a direction shown by EX4. Accordingly, a tensile stress acting on the shielded cell 11 and having an outer peripheral surface circumferential direction shown by F2 in the honeycomb structure 1 increases, and cracks are sometimes generated.

The thickness W of the shielded cell 11 may also be changed with a portion in accordance with a temperature distribution or the like in the honeycomb structure 1. A flow path length sealed in the shielded cell 11 is preferably about 3 to 15 mm from a viewpoint that the flow of the gas is stopped. Needless to say, the length may also be less than or more than this range as long as the flow of the gas is stopped, and as long as the effect of the present invention can be developed even if the flow of the gas is not completely stopped.

Moreover, when the shielded cell is disposed in the outer peripheral part of the honeycomb structure, the catalyst is not easily supported by the outer peripheral part. However, the exhaust gas does not easily flow originally in an exhaust tube of an automobile exhaust gas or the like, and there is a tendency that the catalyst is not effectively utilized outside the diametric direction (outer peripheral part) as compared with a middle part of the honeycomb structure in the diametric direction. Therefore, when the shielded cell is disposed in the outer peripheral part, the catalyst can be supported in an effectively usable range of the catalyst in a concentrated manner. This has already been proposed in Japanese Patent Application Laid-Open No. 61-97037, but in the related art, as a means of forming the shielded cell, a closing member is intentionally disposed to close the cell flow path in the outer peripheral part of the integrally formed and fired honeycomb structure. In the present invention, closing means by the closing member is not particularly used, and the shielded cell can be necessarily formed by an outer peripheral cement coating. Accordingly, a trouble of a step of using the closing member and a member material can be saved, and it is possible to form the shielded cell inexpensively.

As materials of the cell structural part 2 and the outer wall 3, ceramic materials or metal materials are preferably usable. Examples of the ceramic materials include at least one type selected from the group consisting of cordierite, alumina, mullite, lithium aluminum silicate, aluminum titanate, titania, zirconia, silicon nitride, aluminum nitride, silicon carbide, calcium silicate, zirconium phosphate, zirconyl phosphate, ceria, yttria, and magnesia, or a compound of them. The examples also include an adsorptive material containing at least one type selected from a group consisting of a heat-resistant metal, active carbon, silica gel, and zeolite. Furthermore, as a major material of the outer wall, a material having a resistance to heat is preferable, and the examples of the material include ceramic including a main crystal phase constituted of cordierite, in which cordierite exists in a particulate form, ceramic including cordierite and/or ceramic fiber and an amorphous oxide matrix (e.g., matrix formed of colloidal silica or colloidal alumina) existing among cordierite and/or ceramic fiber, and the like. Materials having a high resistance to heat such as SiC particles may also be contained for the purpose of imparting the heat resistance. The cement material of a combination of several types of materials is usable in this manner. The material of the cell structural part may also contain materials having adsorptive and catalytic functions, such as active carbon, silica gel, and zeolite. As the material of the cell structural part, the metal material has a high thermal conductivity, much heat escapes toward the outer wall 3, and therefore an effect that the temperatures of the inner peripheral cells of the cell structural part 2 are raised in a short time without releasing any heat is developed according to the present embodiment. In the absorptive material, an effect appears that the cell structural part is thermally insulated and response of the cell structural part to an exhaust gas temperature is improved in order to sufficiently fulfill a function of adsorbing/desorbing exhaust gas components.

Opposite end portions of the cell structural part 2 in the central axis direction may also be plugged alternately. When the opposite end portions are alternately plugged, any fluid does not pass through holes (flow paths) of the cells without stopping, all the fluid flows through the partition walls of the cells, and therefore the structure can be preferably used as a filter. When the structure is used as the filter, the partition walls 4 of the cell structural part 2 needs to be porous materials, but the above-described ceramic materials are preferably usable.

Figure 2:
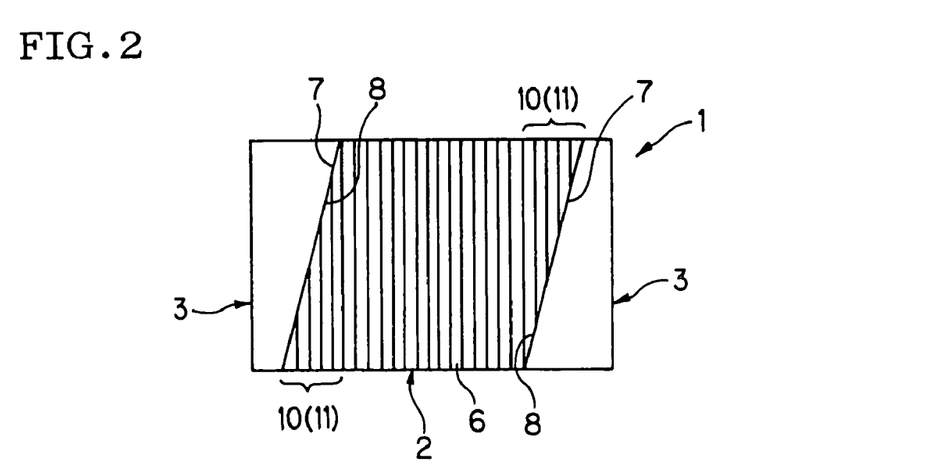
FIG. 2 is a sectional view of the honeycomb structure cut by the plane including the central axis in another embodiment of the present invention.

FIG. 2 is a sectional view of the honeycomb structure cut by the plane including the central axis in another embodiment of the present invention. A cell structural part 2 constituting a honeycomb structure 1 shown in FIG. 2 has an outer shape cut in such a manner that the opposite end portions of a cylinder are oblique with respect to the central axis direction and opposite end surfaces extend in parallel with each other. Central axes of cells 6 and cell structural part 2 substantially cross the opposite end surfaces at right angles. An outer wall 3 is disposed on an outer peripheral surface 7 of the cell structural part 2. The outer periphery of the outer wall 3 is formed into a cylindrical shape, and an inner peripheral surface 8 of the outer wall 3 extends along the outer peripheral surface 7 of the cell structural part 2. The outer peripheral surface 7 of the cell structural part 2 is formed by the end surfaces of outer peripheral cells (an outermost peripheral cell positioned in an outermost periphery and the predetermined number of cells positioned in the inner direction from the outermost peripheral cell) 10 in the same manner as in FIG. 1, and the end surfaces of the respective cells constituting the outer peripheral surface 7 are sealed by the inner peripheral surface 8 of the outer wall 3. Accordingly, the outer peripheral cells 10 of the cell structural part 2 constitute shielded cells 11 which prevent any fluid from flowing.

Figure 3:
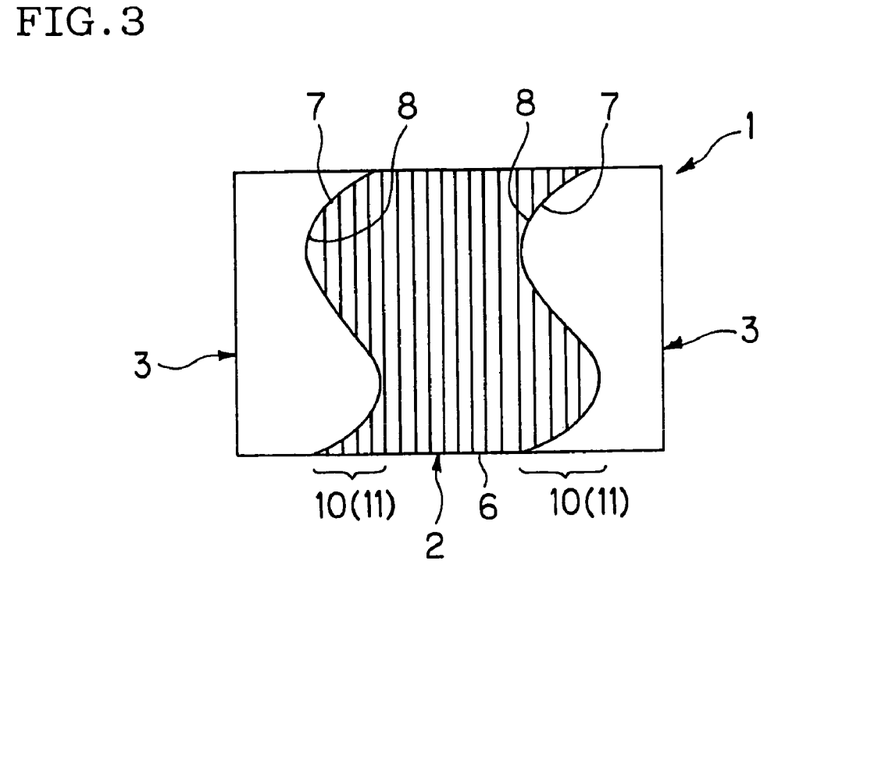
FIG. 3 is a sectional view of the honeycomb structure cut by the plane including the central axis in another embodiment of the present invention.

FIG. 3 is a sectional view of the honeycomb structure cut by the plane including the central axis in another embodiment of the present invention. A cell structural part 2 constituting a honeycomb structure 1 shown in FIG. 3 has a configuration in which a side surface of a cylindrical honeycomb structure including a plurality of cells is cut (machined) in such a manner as to meander with respect to a central axis direction and to form concave/convex portions on the side surface, and an outer wall 3 is disposed on the meandering outer peripheral surface (forming the concave/convex portions). The outer periphery of the outer wall 3 is formed into a cylindrical shape, and an inner peripheral surface 8 of the outer wall 3 extends along a outer peripheral surface 7 of the cell structural part 2. The outer peripheral surface 7 of the cell structural part 2 is mostly formed by the end surfaces of outer peripheral cells (an outermost peripheral cell positioned in an outermost periphery and the predetermined number of cells positioned in an inner direction from the outermost peripheral cell) 10, and the end surfaces of the respective cells constituting the outer peripheral surface 7 are sealed by the inner peripheral surface 8 of the outer wall 3. Accordingly, the outer peripheral cells 10 of the cell structural part 2 constitute shielded cells 11 which prevent any fluid from flowing.

Figure 4:
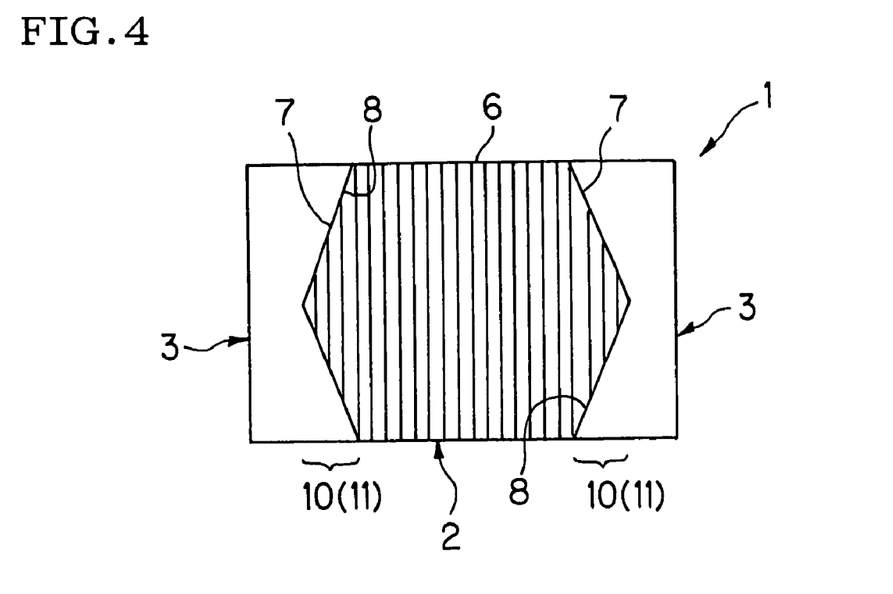
FIG. 4 is a sectional view of the honeycomb structure cut by the plane including the central axis in another embodiment of the present invention.

FIG. 4 is a sectional view of the honeycomb structure cut by the plane including the central axis in another embodiment of the present invention. A cell structural part 2 constituting a honeycomb structure 1 shown in FIG. 4 is shaped by using two cell structural parts having truncated cone shapes shown in FIG. 1 and bonding lower surfaces (sides having large areas in the end surfaces of truncated cones in an axial direction) of the cell structural parts 2 to each other. The end surfaces of the respective cells constituting an outer peripheral surface 7 are sealed by an inner peripheral surface 8 of a outer wall 3 in the same manner as in the honeycomb structure 1 shown in FIG. 1. Accordingly, outer peripheral cells (an outermost peripheral cell positioned in an outermost periphery and the predetermined number of cells positioned in an inner direction from the outermost peripheral cell) 10 of the cell structural part 2 constitute shielded cells 11 which prevent any fluid from flowing.

Figure 5:
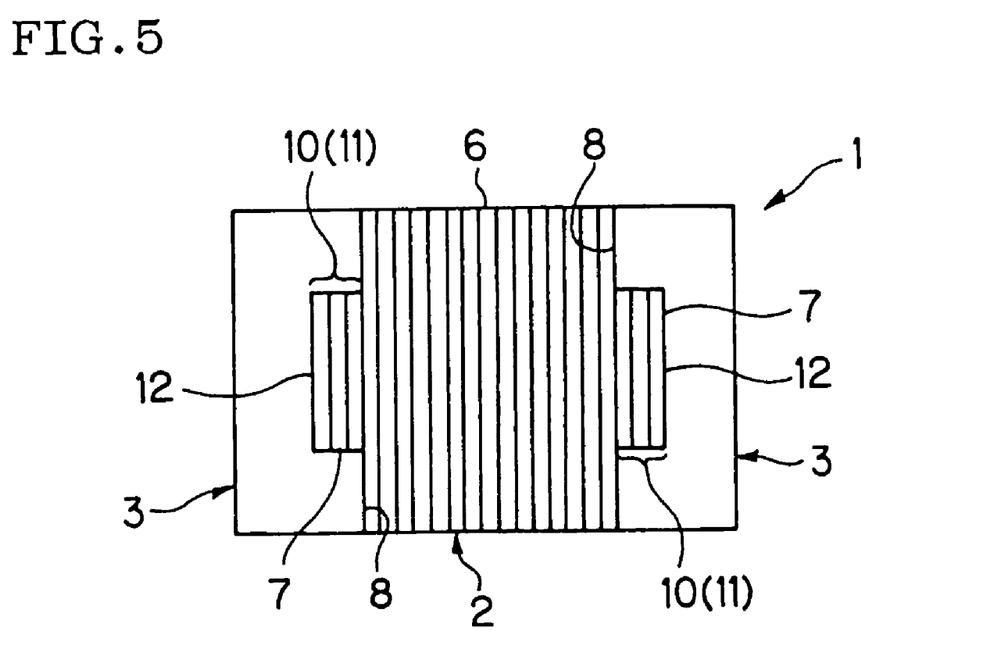
FIG. 5 is a sectional view of the honeycomb structure cut by the plane including the central axis in another embodiment of the present invention.

FIG. 5 is a sectional view of the honeycomb structure cut by the plane including the central axis in another embodiment of the present invention. A cell structural part 2 constituting a honeycomb structure 1 shown in FIG. 5 has a shape obtained by cutting (machining) a cylindrical honeycomb structure including a plurality of cells by a certain length toward the inside of a central axis direction from other end portions in the central axis direction and by a certain length toward the inside of a diametric direction from an outermost side of the diametric direction. That is, an annular cell structural part 12 is disposed on the side surface of a cylindrical cell structure in a certain width in the central axis direction in the vicinity of a center of the cylindrical cell structure in the central axis direction. Moreover, an outer wall 3 is disposed on an outer peripheral surface 7 of the cell structural part 2. In the present embodiment, the annular cell structural part 12 corresponds to outer peripheral cells 10, and opposite end surfaces of the part in the central axis direction are sealed by the inner peripheral surface of the outer wall 3 to constitute shielded cells 11.

Figures 6A, 6B:
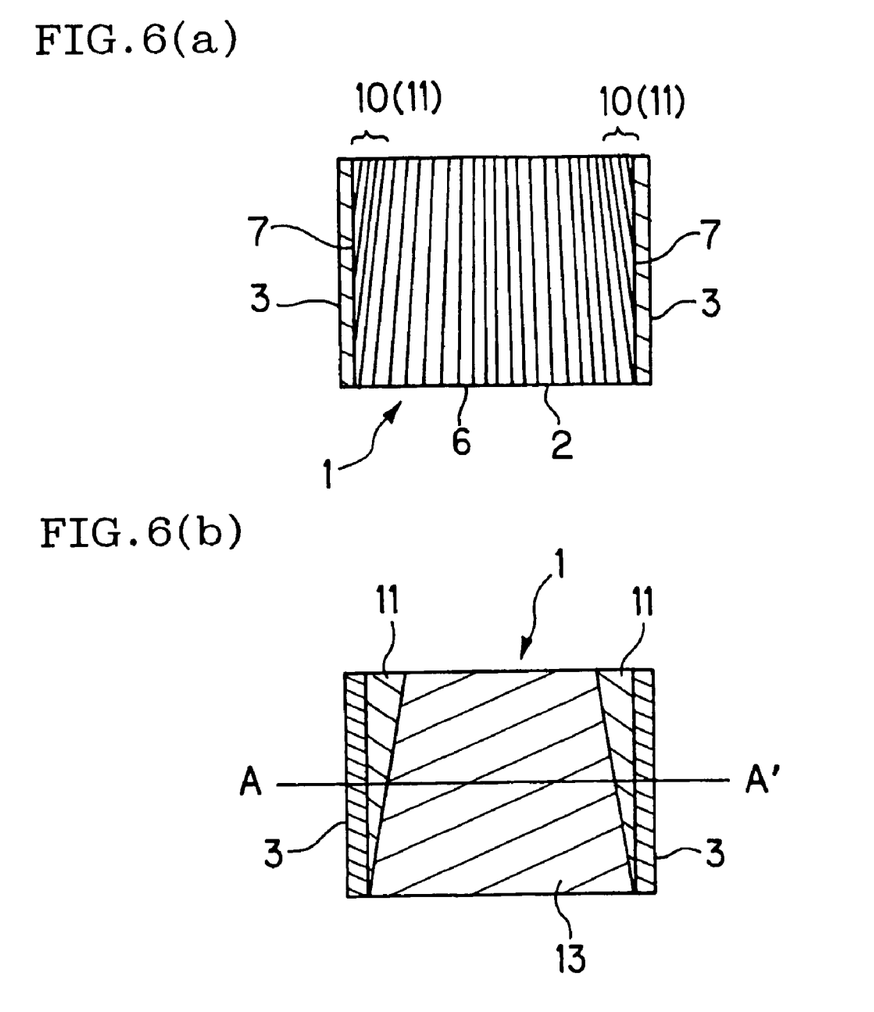
FIG. 6(a) shows an arrangement of cells.
FIG. 6(b) shows a region of shielded cells and through-cells.
Figure 7A:
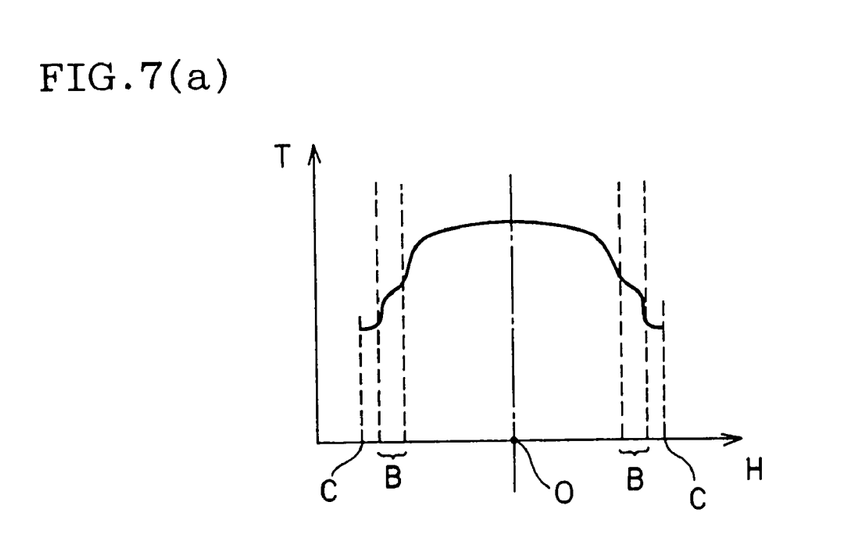
FIG. 7(a) shows a temperature distribution at a time when a high-temperature gas flows.
Figure 7B:
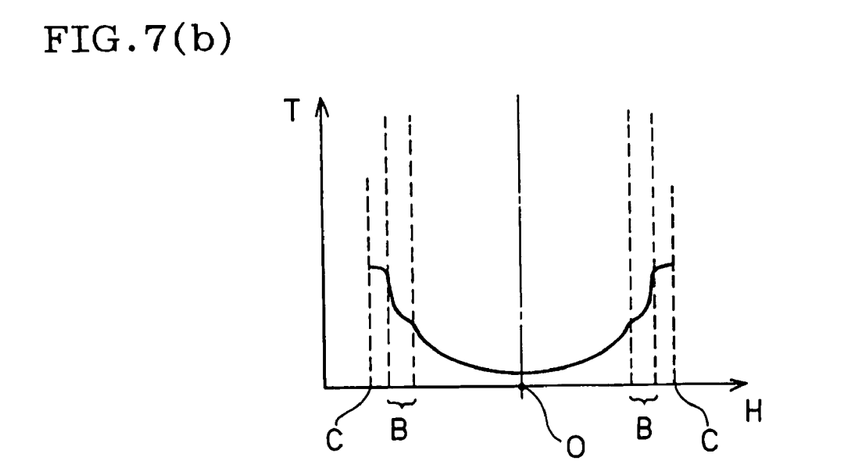
FIG. 7(b) shows a temperature distribution at a time when a low-temperature gas flows.

The honeycomb structural bodies of the present invention described in the above-described embodiments have superior thermal properties, and thermal effects of other embodiments of the honeycomb structure of the present invention will be described hereinafter in more detail. A honeycomb structure 1 shown in FIG. 6(a) is constituted of a cylindrical cell structural part 2 and an outer wall 3 disposed on an outer peripheral surface 7 of the cell structural part 2, and end surfaces of cells 6 are disposed on the outer peripheral surface 7 of the cell structural part 2. Since outer peripheral cells 10 of the honeycomb structure 1 constitute shielded cells 11 as shown in FIG. 6(a), a region of a through-cell 13 through which a gas flows and regions of the shielded cells 11 through which any gas does not flow are formed as schematically shown in FIG. 6(b). Moreover, as shown in FIG. 7(a), when a temperature of the gas flowing through the honeycomb structure 1 rapidly rises, the region of the through-cell 13 allowing the gas to flow is heated by a gas flow at a raised temperature, and the temperature largely rises, but the region of the shielded cell 11 preventing the gas from flowing is not rapidly heated, and therefore the temperature rises little. It is to be noted that in FIG. 7(a), abscissa H indicates a position H on a straight line (straight line A-A' of FIG. 6(b)) crossing a central axis passing through a central axis direction intermediate point at right angles in a section of the honeycomb structure 1 including the central axis, ordinate T indicates a temperature in each position H, and a graph shown in FIG. 7(a) is a temperature distribution in the position H. O indicates a position of the central axis, B indicates the region of the shielded cell 11, and C indicates an outermost end of the honeycomb structure 1 in the diametric direction. As shown in FIG. 7(b), when the temperature of the gas flowing through the honeycomb structure 1 rapidly drops, the region of the through-cell 13 allowing the gas to flow is cooled by a gas flow at a lowered temperature, the temperature largely drops, but the region of the shielded cell 11 preventing the gas from flowing is not rapidly cooled, and therefore the temperature drops little.

Since the region of the shielded cell 11 is not easily influenced by a vertical variance of a gas temperature in this manner, a difference in temperature between the outer wall 3 and the region of the through-cell 13 is relived, and therefore there is an effect of inhibiting heat from being radiated toward the outside from the inside of the honeycomb structure 1 in the diametric direction at the time of heating.

A catalyst body in the present invention is constituted in such a manner that a catalyst is supported on the inside (partition wall surfaces) of the cells and/or pore inner surfaces inside the partition walls of the honeycomb structure in the present invention described above. This catalyst body is preferably used in adsorbing or absorbing particulate substances of solid components or SOF content which are contained in an exhaust gas exhausted from an internal combustion engine, such as an automobile exhaust gas, and whose nuclei are gaseous components such as HC, NOx, and CO and/or carbon to purify the exhaust gas.

Figure 8A:
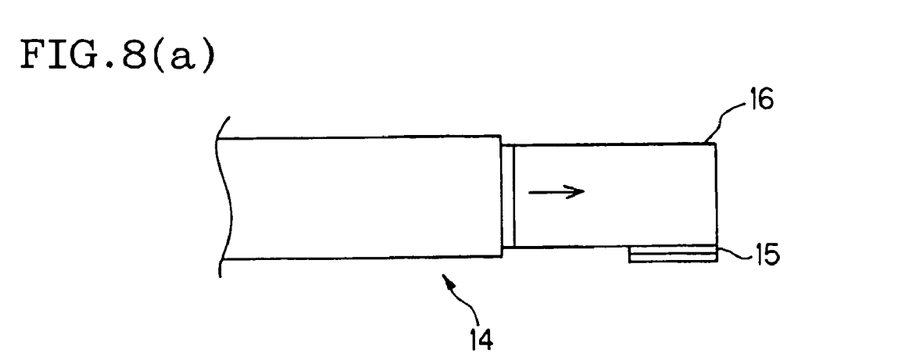
FIG. 8(a) shows an extrusion step.
Figure 8B:
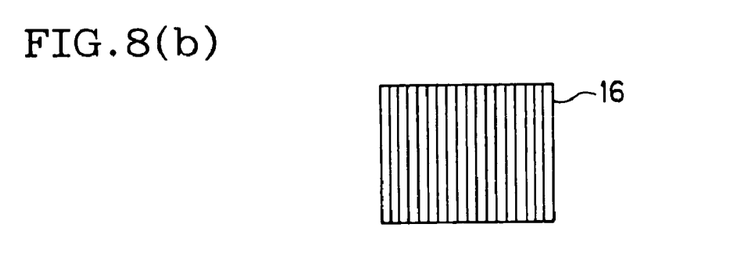
FIG. 8(b) shows a drying/firing step.
Figure 8C:
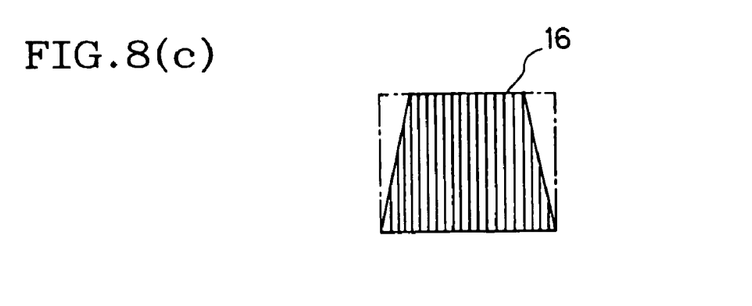
FIG. 8(c) shows an outer periphery working step.
Figure 8D:
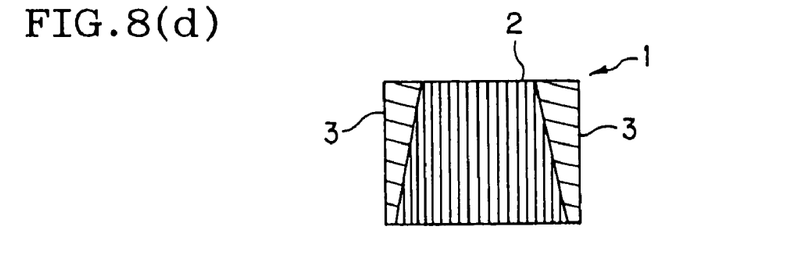
FIG. 8(d) shows an outer wall preparing step.
Figure 9A:
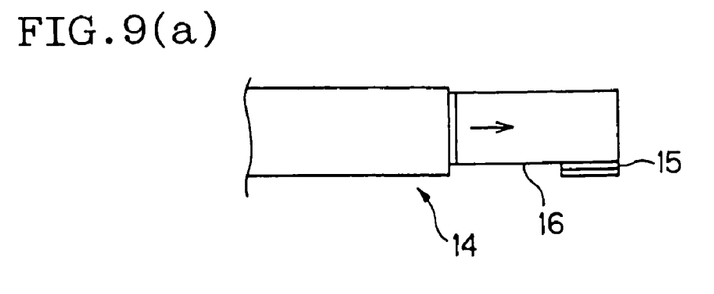
FIG. 9(a) shows an extrusion step.
Figure 9B:
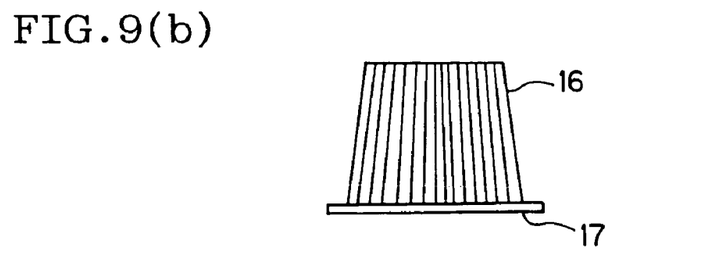
FIG. 9(b) shows a drying step.
Figure 9C:
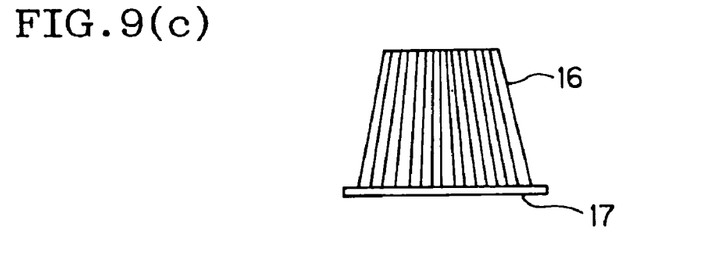
FIG. 9(c) shows a firing step.
Figure 9D:
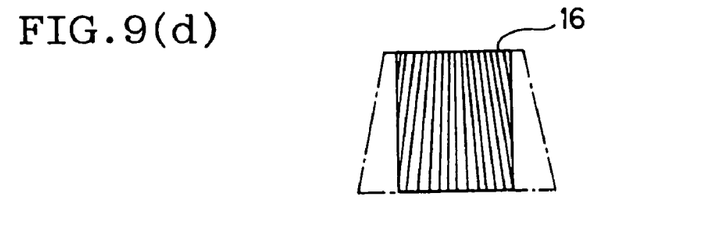
FIG. 9(d) shows an outer periphery working step.
Figure 9E:
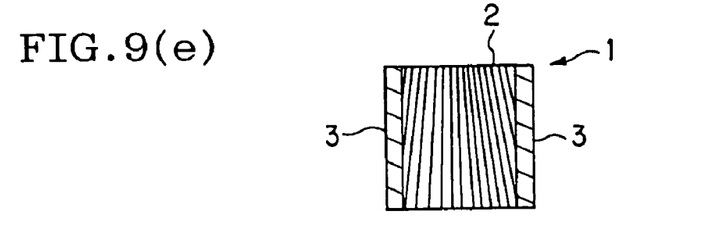
FIG. 9(e) shows an outer wall preparing step.
Figure 10A:
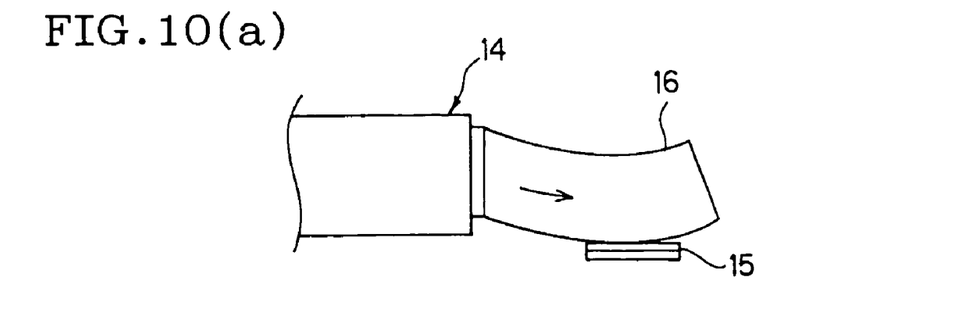
FIG. 10(a) shows an extrusion step.
Figure 10B:
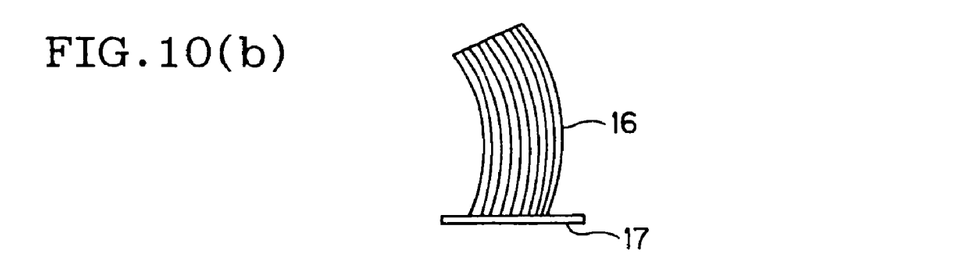
FIG. 10(b) shows a drying/firing step.
Figure 10C:
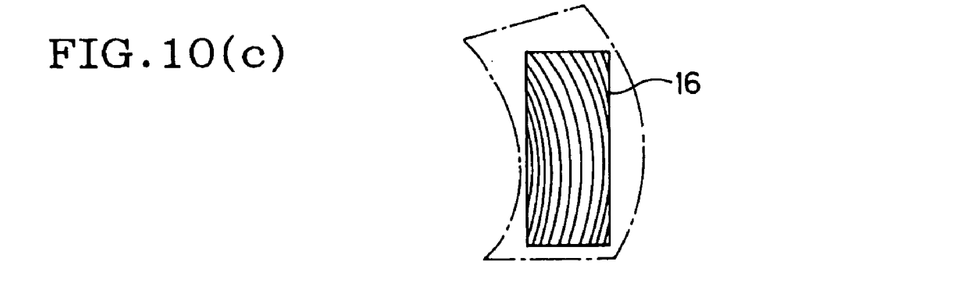
FIG. 10(c) shows an outer periphery working step.
Figure 10D:
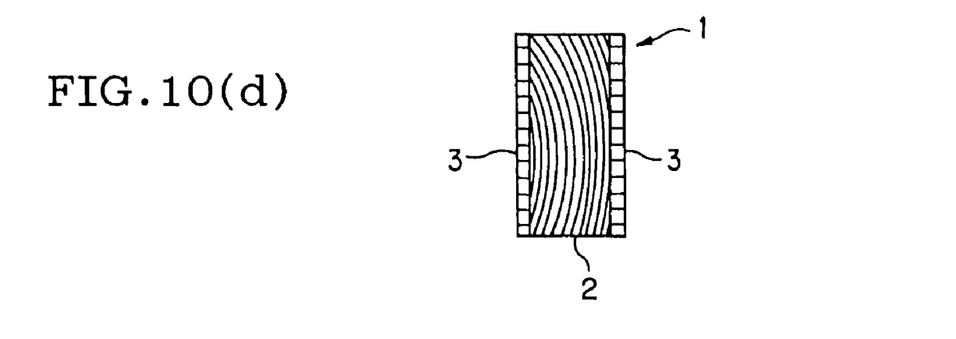
FIG. 10(d) shows an outer wall preparing step.

A method of manufacturing the honeycomb structure of the present invention will be concretely described hereinafter. To manufacture the honeycomb structure shown in FIG. 1, first as shown in FIG. 8(a), as generally performed, a cell structure 16 (cell structural part) including a plurality of cells partitioned by partition walls in a honeycomb shape to constitute flow paths allowing a fluid to flow is prepared by an extrusion method using an extruder 14. In FIG. 8, reference numeral 15 denotes a tray for the cell structure 16. Next, a side surface of the cell structure 16 (cell structural part) shown in FIG. 8(b) is worked in a tapered shape, and the cell structure 16 (cell structural part) is formed into a truncated cone shape as shown in FIG. 8(c). Accordingly, end surfaces of cells are disposed on the side surface (outer peripheral surface) of a truncated cone. Moreover, in a last outer wall preparing step, the outer peripheral surface of the truncated cone shaped cell structure 16 (cell structural part) is cement-coated with an outer wall, accordingly the end surfaces of the cells disposed on the outer peripheral surface side are sealed by a cement coating material, shielded cells are formed, and a honeycomb structure 1 is prepared as shown in FIG. 8(*d*). Since the end surfaces of the cells are sealed simultaneously with the forming of the outer wall, a step of sealing the end surfaces of the cells does not have to be disposed separately, and the structure can be produced efficiently. It is to be noted that the cell structure 16 constitutes a cell structural part 2 in the prepared honeycomb structure 1.

The honeycomb structure shown in FIG. 2 can be manufactured by working the cell structure (cell structural part) into a cylindrical shape inclined with respect to a central axis direction during the working of the side surface after the firing in the method of manufacturing the honeycomb structure shown in FIG. 1.

The honeycomb structure shown in FIG. 3 can be manufactured by working the outer peripheral surface of the cell structure in such a manner as to form concave/convex portions during the working of the side surface after the firing in the method of manufacturing the honeycomb structure shown in FIG. 1. End part corner portions of the cell structure may also be chamfered, and coated with a cement coating, and this working is also one concave/convex configuration.

Another embodiment of the method of manufacturing the honeycomb structure of the present invention is as follows. As shown in FIG. 9(*a*), first a cell structure 16 (cell structural part) including a plurality of cells partitioned by partition walls in a honeycomb shape to constitute flow paths allowing a fluid to flow is prepared by an extrusion method generally performed using an extruder 14. Next, as shown in FIG. 9(*b*), in a drying step, one end part of the cell structure 16 in a central axis direction is disposed downwards, and the structure is placed on a hardly slipping base 17. When the structure is dried in this state, the end part of the structure brought into contact with the hardly slipping base 17 does not easily contract by friction with the base 17. Since this contraction is smaller than that of the other end part, the diameter of the end part on the side contacting the base 17 becomes large as compared with that of the other end part, and the structure is entirely formed into a truncated cone shape. Accordingly, the cells are arranged to be inclined outside the diametric direction toward the end part having a large diameter from the end part having a small diameter. Furthermore, as shown in FIG. 9(*c*), in a firing step, the end part side whose diameter has been enlarged in the drying step is disposed downwards, and the structure is disposed on the hardly slipping base 17. As a result, the structure is formed into the truncated cone shape having a further large difference between the diameter of the end part on the side contacting the base 17 and that of the other end part. Next, as shown in FIG. 9(*d*), in an outer periphery working step, the tapered outer peripheral surface of the cell structure having the truncated cone shape is worked into a cylindrical shape. Accordingly, one-side end surfaces of the cells inclined outside the diametric direction and positioned in the vicinity of the outside of the diametric direction are arranged on the outer peripheral surface side of the cell structure. At this time, a working width is preferably in a range of 1 to 30 mm in accordance with the outer diameter of the honeycomb structure 1. Finally, as shown in FIG. 9(*e*), in an outer wall preparing step, the outer peripheral surface of the cell structure 16 (cell structural part) is coated with an outer wall of cement, accordingly the end surfaces of the cells arranged on the outer peripheral surface side are sealed, and shielded cells are formed. Since the end surfaces of the cells are sealed by the cement coating material on the outer peripheral surface simultaneously with the forming of the outer wall, a step of sealing the end surfaces of the cell does not have to be disposed separately, and the structure can be produced efficiently. It is to be noted that the above-described cell structure 16 constitutes the cell structural part 2 in the prepared honeycomb structure 1.

Furthermore, another embodiment of the method of manufacturing the honeycomb structure of the present invention is as follows. As shown in FIG. 10(*a*), first a cell structure 16 (cell structural part) including a plurality of cells partitioned by partition walls in a honeycomb shape to constitute flow paths allowing a fluid to flow and including a curved axis is prepared by an extrusion method generally performed using an extruder 14. Next, as shown in FIG. 10(*b*), drying and firing are performed while holding a curved state. Next as shown in FIG. 10(*c*), in an outer periphery working step, the outer peripheral surface of the curved cell structure 16 (cell structural part) is worked into a cylindrical shape. Accordingly, cutout portions formed on intermediate portions of the cells in an axial direction by working one side or opposite-side end surfaces and/or outer periphery of each cell positioned in the vicinity of the outside of the diametric direction of the cell structure in the cells curved with the curving of the cell structure are arranged on the outer peripheral surface side of the cell structure. Finally, as shown in FIG. 10(*d*), in an outer wall preparing step, the outer peripheral surface of the cell structure 16 (cell structural part) is coated with an outer wall of cement, the end surfaces of the cells arranged on the outer peripheral surface side and/or the intermediate portions of the cells in the axial direction are sealed, and shielded cells are formed. Since the end surfaces of the cells are sealed by the cement coating material on the outer peripheral surface simultaneously with the forming of the outer wall, a step of sealing the end surfaces of the cell does not have to be disposed separately, and the structure can be produced efficiently. It is to be noted that the above-described cell structure 16 constitutes a cell structural part 2 in a prepared honeycomb structure 1.

INDUSTRIAL APPLICABILITY

As described above, according to a honeycomb structure of the present invention, when a cell structural part is heated, heat can be inhibited from being radiated toward an outer wall, therefore a temperature rising time for the cell structural part after start of an operation is shortened, and a catalytic activity can be enhanced in a short time when a catalyst is supported. According to a method of manufacturing the honeycomb structure of the present invention, since the end surfaces of cells are sealed simultaneously with the forming of the outer wall, a step of sealing the end surfaces of the cells does not have to be disposed separately, and the structure can be produced efficiently. According to a catalyst body of the present invention, when the cell structural part is heated, the heat can be inhibited from being radiated to the outer wall, therefore a temperature rising time for the cell structural part after start of an operation is shortened, and the catalytic activity can be enhanced in a short time.

The invention claimed is:

1. A honeycomb structure comprising: a cell structural part including a plurality of cells partitioned by partition walls in a honeycomb shape to form flow paths allowing a fluid to flow therein; and an outer wall disposed on an outer peripheral surface of the cell structural part, characterized in that an outermost peripheral cell positioned in an outermost periphery of the cell structural part and a predetermined number of cells (outer peripheral cells) positioned in an inner direction from the outermost peripheral cell among the cells are sealed by an inner peripheral surface of the outer wall in an end portion and/or an intermediate portion of at least one of the outermost peripheral cell and the outer peripheral cell in a central axis direction to form shielded cells which prevent the fluid from flowing.

2. The honeycomb structure according to claim 1, wherein a thickness of the shielded cells in a diametric direction of the honeycomb structure is 10% or less of an outer diameter of the honeycomb structure.

3. The honeycomb structure according to claim 1, wherein the cell structural part and the outer wall are constituted of ceramic materials.

4. The honeycomb structure according to claim 1, wherein the cell structural part and the outer wall are constituted of metal materials.

5. The honeycomb structure according to claim 1, wherein the cell structural part contains a material having an adsorption function or a catalyst function.

6. The honeycomb structure according to claim 1, wherein the outer wall is constituted of a heat-resistant material.

7. The honeycomb structure according to claim 1, for use as a filter, wherein opposite end portions of the cells in the central axis direction are alternately plugged.

8. A catalyst body comprising a honeycomb structure comprising: a cell structural part including a plurality of cells partitioned by partition walls in a honeycomb shape to form flow paths allowing a fluid to flow therein; and an outer wall disposed on an outer peripheral surface of the cell structural part, wherein an outermost peripheral cell positioned in an outermost periphery of the cell structural part and a predetermined number of cells (outer peripheral cells) positioned in an inner direction from the outermost peripheral cell among the cells are sealed by an inner peripheral surface of the outer wall in an end portion and/or an intermediate portion of at least one of the outermost peripheral cell and the outer peripheral cell in a central axis direction to form shielded cells which prevent the fluid from flowing, the honeycomb structure supporting a catalyst inside the cells and/or inside the partition walls.

9. The catalyst body according to claim 8, wherein the catalyst has a function of purifying an automobile exhaust gas.

* * * * *